United States Patent [19]

Hoffman et al.

[11] Patent Number: 5,234,185
[45] Date of Patent: Aug. 10, 1993

[54] UNITARY PIPE CLAMP AND ASSEMBLY

[75] Inventors: Donald E. Hoffman, Java Center; Frank C. Falzone, Cheektowaga, both of N.Y.

[73] Assignee: General Motors Corporation, Detroit, Mich.

[21] Appl. No.: 842,311

[22] Filed: Feb. 21, 1992

[51] Int. Cl.⁵ .............................................. F16L 5/00
[52] U.S. Cl. ................... 248/56; 248/68.1; 248/73
[58] Field of Search ............... 248/49, 56, 57, 68.1, 248/73, 74.1, 74.4

[56] References Cited

U.S. PATENT DOCUMENTS

| | | | |
|---|---|---|---|
| 3,634,608 | 1/1972 | Buhl et al. | 248/56 X |
| 3,906,592 | 9/1975 | Sakasegawa et al. | |
| 4,041,241 | 8/1977 | Olmstead et al. | 248/56 X |
| 4,172,496 | 10/1979 | Melnyk | |
| 4,382,453 | 5/1983 | Bujan et al. | |
| 4,478,436 | 10/1984 | Hashimoto | |
| 4,479,668 | 10/1984 | Jaquet | |
| 4,517,408 | 5/1985 | Pegram | 248/56 X |
| 4,881,705 | 11/1989 | Kraus | |
| 4,930,733 | 6/1990 | Logsdon | 248/56 |
| 5,076,518 | 12/1991 | Washizu et al. | 248/68.1 |
| 5,113,717 | 5/1992 | Plamper et al. | 248/74.1 X |

FOREIGN PATENT DOCUMENTS 3441302 4/1986 Fed. Rep. of Germany.
1350571 4/1974 United Kingdom ............... 248/74.4

*Primary Examiner*—David A. Scherbel
*Assistant Examiner*—Derek J. Berger
*Attorney, Agent, or Firm*—Ronald L. Phillips; Patrick M. Griffin

[57] ABSTRACT

A one-piece molded clamp having two portions connected by a living hinge defines cylindrical passages for two pipes and annular grooves for receiving beads on the pipes. A locking tang on one portion engages a mating cavity on the other portion to hold the clamp closed. The pipes pass through apertures in a wall and the clamp is mounted to the wall by a fastener passing through the clamp. Outstanding ribs on the wall hug the outer surface of the clamp to assist the locking tang in holding the clamp closed. A foam seal with a rubber surface layer is compressed between the clamp and the wall to prevent leaks through the wall apertures.

3 Claims, 2 Drawing Sheets

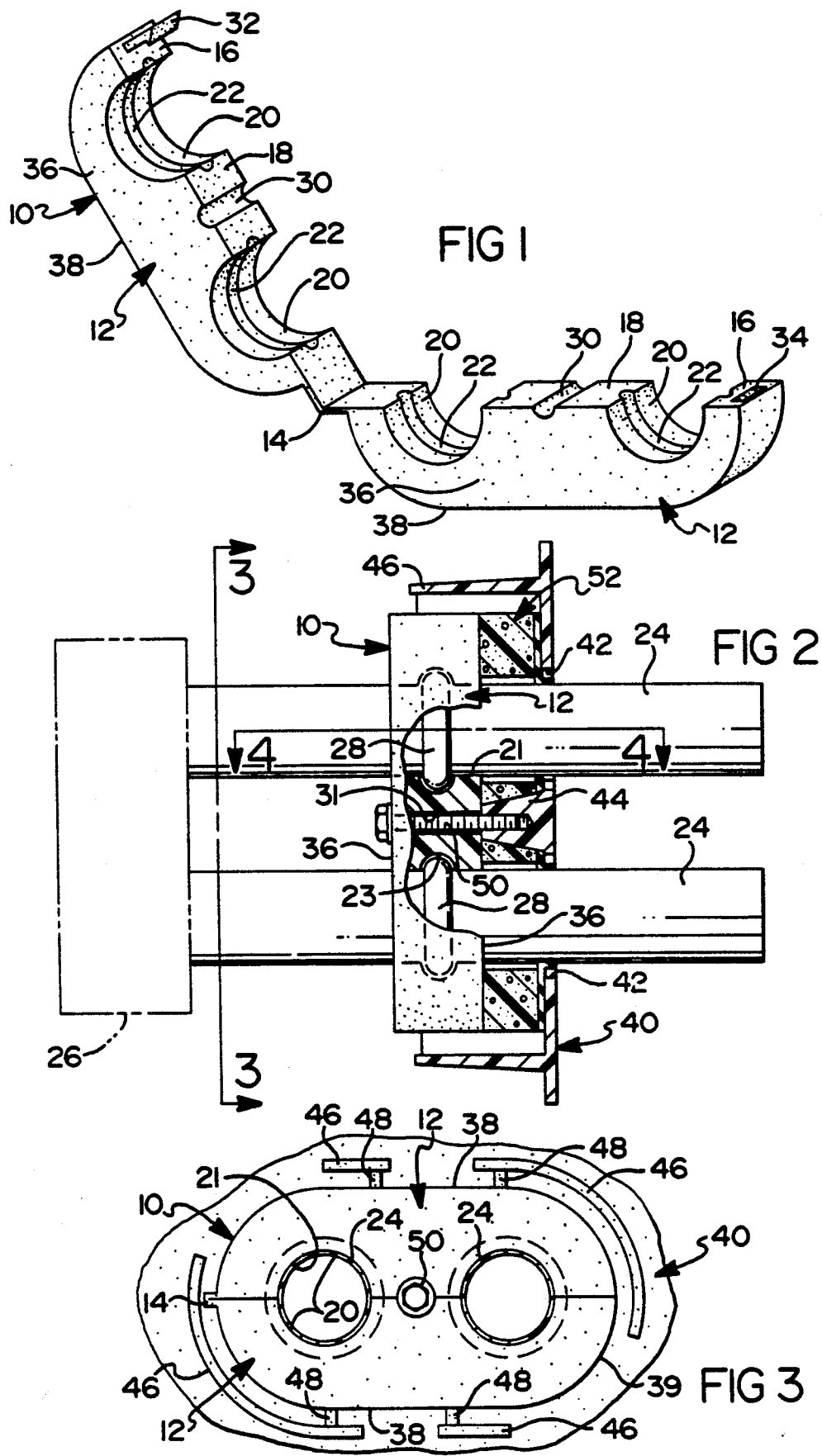

UNITARY PIPE CLAMP AND ASSEMBLY

FIELD OF THE INVENTION

This invention relates to a pipe clamp and an assembly including the pipe clamp for holding a plurality of pipes to a support.

BACKGROUND OF THE INVENTION

In an automotive air conditioning and heating system having a case, the heater core in the case has pipes extending through an aperture in the case into the vehicle engine compartment for attachment to heater hoses carrying coolant circulating from the engine. The heater core and the pipes are subject to stress particularly during manufacture when the heater hoses are attached to the pipes. To avoid such stress it is desirable to secure the pipes to the case in a manner to prevent movement of the pipes when the hoses are installed. Further, for ease of assembly, it is desirable for the pipes to be accurately positioned at a prescribed location. It is also desirable that the case aperture be sealed when the pipes are installed.

It is already known to use a metal bracket and spring clamp to position the heater pipes and thereby provide a positive centerline spacing, but that does not prevent axial movement of the pipes nor does it seal the aperture in the case through which the pipes extend. It is also known in other applications to fashion pipe clamps or hose clamps from molded one-piece elements with hinged portions that close together around the pipes or hoses.

SUMMARY OF THE INVENTION

It is therefore an object of the invention to provide a pipe clamp for holding pipes to a mounting member in a manner to prevent axial movement of the pipes. It is another object to provide a pipe mounting assembly for mounting pipes to an apertured wall member through which the pipes pass using such a pipe clamp and for sealing the wall aperture.

The invention is carried out by a one piece clamp for holding a plurality of pipes having circumferential beads comprising: a molded polymer body having two mating portions; an integral flexible web connecting the portions to allow the portions to be closed together; each portion containing a cavity for each pipe to be clamped and a recess in each cavity for receiving the bead of a pipe, whereby the combined recesses and cavities complement the shape of the pipes to hold the pipes against axial movement in the clamp, and means for fastening the portions together in closed position.

The invention is further carried out by an assembly for mounting pipes to a wall member comprising: a wall member apertured for the passage of pipes therethrough; pipes extending through the wall member, each pipe having a circumferential bead; a one-piece molded clamp comprising two cooperative portions mating at an interface and having an outer surface spaced from the interface, the interface of the portions defining cylindrical passages receiving the respective pipes and each passage having an annular groove receiving the bead of a pipe; and means for securing the clamp to the wall member, whereby the pipes are fixed against axial movement relative to the wall.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an isometric view of a pipe clamp according to the invention shown in open position;

FIG. 2 is a partly broken away and cross-sectional view of a pipe mounting assembly incorporating the pipe clamp of FIG. 1;

FIG. 3 is a view of the pipe mounting assembly taken along line 3—3 of FIG. 2;

DESCRIPTION OF THE INVENTION

The ensuing description is directed to a pipe clamp and assembly which were specifically developed for use in a vehicle air conditioning and heater unit, but have other applications as well. The pipe clamp in particular is useful where both lateral and axial position of a pipe must be maintained and the pipe can be provided with a bead to fit within the clamp.

Figure 4:
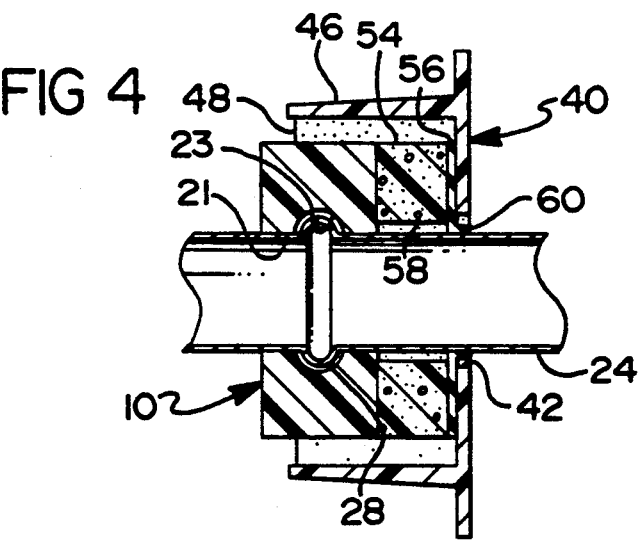
FIG. 4 is a cross section of the pipe mounting assembly taken along line 4—4 of FIG. 2.

Referring to FIGS. 1, 2, 3 and 4, a pipe clamp 10 has two halves or portions 12 connected by a flexible web 14 also known as a living hinge. The two portions 12 and the hinge 14 are molded as one piece from a polymer material, such as polypropylene filled with mica, and each portion has an interface surface 16 defining a mating plane 18 where the portions touch when they are closed together. The interface surface 16 of each portion also includes a pair of semi-cylindrical cavities 20 and a semi-annular groove 22 at the center of each cavity so that when closed the clamp has two cylindrical passages 21 with annular grooves 23 which conform to pipes 24 that extend from a heater core 26, the pipes 24 having circumferential beads 28 which nest in the grooves 22. The grooves 22 are slightly wider than the beads 28; this allows for manufacturing variations between the heater core 26 and the pipes 24 when assembled into the case wall 40. A small straight groove 30 in each interface 16 between the cavities 20 and parallel thereto form a passage 31 through the clamp when the portions are closed. A locking tang 32 on one portion opposite the hinge 14 protrudes normally from the mating plane 18 and cooperates with a mating cavity 34 on the other portion for fastening the portions 12 together when closed. Opposite end faces 36 of the clamp 10 comprise flat surfaces perpendicular to the cylindrical passages 21. The overall shape of the clamp, when closed, is oval, defined by flat external surfaces 38 spaced from and parallel to the interface surface 16 and by arcuate end surfaces 39.

FIGS. 2 and 3 show the pipe mounting assembly including the wall 40 of the air conditioning and heater case which has an aperture 42 for each pipe 24 and a boss 44 between the apertures extending toward the pipe clamp 10. The wall 40 has internal ribs 46 spaced laterally from the pipe clamp 10 and partially surrounding the clamp. Four clamp holding ribs 48 outstanding from the wall extend inwardly from the internal ribs 46 to contact the outer surfaces 38 of the clamp portions 12, thus permanently holding the clamp closed when installed on the wall 40. The internal ribs 46 serve as reinforcements for the holding ribs 48. The holding ribs 48 are arranged in two pairs, each pair being spaced on opposite sides of the wall apertures 42. A screw 50 extending through the passage 31 of the clamp is threaded into the boss 44 to securely hold the clamp 10 to the wall 40. The screw 50 in concert with the holding ribs 48 positively locates the pipes relative to the wall, and the screw in concert with the pipe beads 28 seated in the annular grooves 22 positively locates the pipes in the axial direction.

Figure 5:
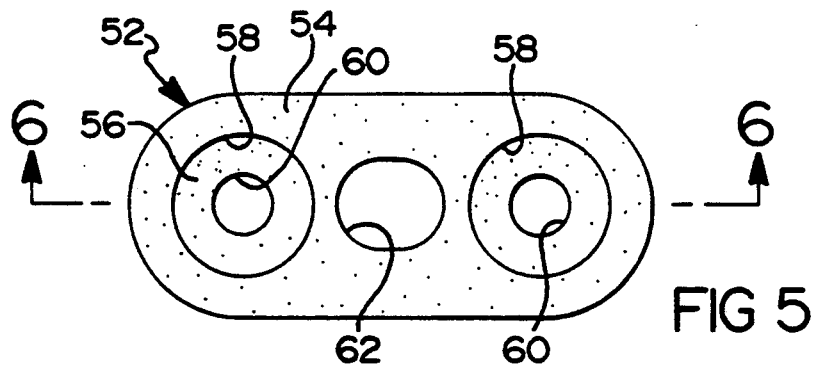
FIG. 5 is a front view of a seal used in the assembly of FIG. 2.
Figure 6:
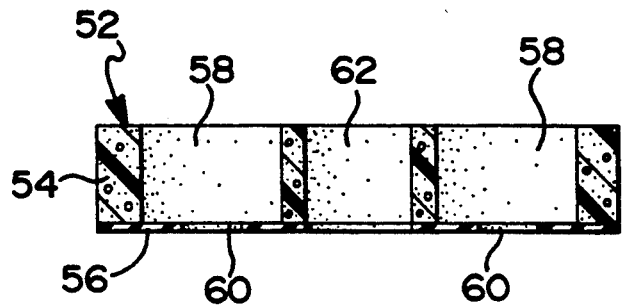
FIG. 6 is a cross-sectional view of the seal taken along line 6—6 of FIG. 5.

To prevent leakage of water or other fluids from the engine compartment into the case, a gasket or seal 52 is sandwiched between a flat end face 36 of the clamp 10 and the inner surface of the wall 40. The seal, as shown in FIGS. 2, 4, 5 and 6, has essentially the same oval shape as the clamp 10 and comprises a foam body 54 which engages the wall 40 and a thin rubber layer 56 on one side of the body 54 which engages the surface 36 of the clamp. The foam body 54 has large apertures 58 to receive the pipes 24 and the rubber layer 56 has apertures 60 concentric with the apertures 58 which are smaller than the pipes 24 prior to assembly so that the rubber will stretch tightly around the pipes upon assembly to assure a tight sealing engagement. The seal 52 also has a central aperture 62 which fits over the boss 44. The thickness of the foam body prior to installation is greater than the height of the boss 44 so that the seal will be compressed between the clamp 10 and the wall 40.

The pipe mounting is assembled by first installing the clamp 10 over the pipes 24 by aligning the semi-annular grooves 22 with the beads 28 and closing the portions 12 together so that the locking tang 32 snaps into the cavity 34 to hold the clamp in place during the assembly process. Then the seal 52 is pushed onto the pipes 24 and the pipes are then inserted through the apertures 42 of the wall 40 far enough for the clamp 10 to abut the boss 44 and compress the seal 52 to provide a tight joint. The holding ribs 48 engage the outer surface of the clamp to hold the clamp closed with greater security than that afforded by the locking tang. The screw 50 is installed through the clamp into the boss to secure the clamp to the wall, whereby the pipes are accurately positioned relative to the wall and securely held to prevent movement of the pipes when the heater hoses are subsequently installed.

The embodiments of the invention in which an exclusive property or privilege is claimed are defined as follows:

1. An assembly for mounting two pipes to a wall member comprising:
    a wall member having two apertures for the two pipes and a boss between the apertures and extending toward the clamp;
    pipes extending through the wall member, each pipe having a circumferential bead;
    a one-piece molded clamp comprising two cooperative portions mating at an interface and having an outer surface spaced from the interface, the interface of the portions defining cylindrical passages encompassing the respective pipes and each passage having an annular groove receiving the bead of a pipe;
    a bore in the clamp interface between and parallel to the cylindrical passages and aligned with the boss; and
    a fastener extending through the bore and secured to the boss, whereby the pipes are fixed against axial movement relative to the wall.

2. An assembly for mounting two pipes to a wall member comprising:
    a wall member having two apertures for the two pipes and a boss between the apertures and extending toward the clamp;
    pipes extending through the wall member, each pipe having a circumferential bead;
    a one-piece molded clamp comprising two cooperative portions mating at an interface and having an outer surface spaced from the interface, the interface of the portions defining cylindrical passages encompassing the respective pipes and each passage having an annular groove receiving the bead of a pipe;
    a bore in the clamp interface between and parallel to the cylindrical passages and aligned with the boss; and
    a fastener extending through the bore and secured to the boss, and, a seal compressed between the clamp and the wall member and having apertures for accommodating the pipes and the boss, whereby the pipes are fixed against axial movement relative to the wall.

3. An assembly for mounting two pipes to a wall member comprising:
    a wall member having two apertures for the two pipes and a boss between the apertures and extending toward the clamp;
    pipes extending through the wall member, each pipe having a circumferential bead;
    a one-piece molded clamp comprising two cooperative portions mating at an interface and having an outer surface spaced from the interface, the interface of the portions defining cylindrical passages encompassing the respective pipes and each passage having an annular groove receiving the bead of a pipe;
    a bore in the clamp interface between and parallel to the cylindrical passages and aligned with the boss;
    a fastener extending through the bore and secured to the boss, whereby the pipes are fixed against axial movement relative to the wall, and,
    a plurality of ribs outstanding from the wall member at opposite sides of the apertures and engaging the outer surface of the clamp for holding the clamp closed.

* * * * *